Jan. 1, 1935. E. F. ZAPARKA Re. 19,412

AIRCRAFT AND CONTROL THEREOF

Original Filed April 3, 1931 4 Sheets-Sheet 1

INVENTOR
Edward F. Zaparka
BY
Brandon, Whitcomb & Davies
ATTORNEY

Jan. 1, 1935. E. F. ZAPARKA Re. 19,412

AIRCRAFT AND CONTROL THEREOF

Original Filed April 3, 1931 4 Sheets-Sheet 2

INVENTOR
Edward F. Zaparka
BY
Franklin, Whitcomb & Davis
ATTORNEY

Jan. 1, 1935. E. F. ZAPARKA Re. 19,412

AIRCRAFT AND CONTROL THEREOF

Original Filed April 3, 1931 4 Sheets-Sheet 3

INVENTOR
Edward F. Zaparka
BY
Bradbury, Whitcomb & Davies
ATTORNEY

Jan. 1, 1935. E. F. ZAPARKA Re. 19,412

AIRCRAFT AND CONTROL THEREOF

Original Filed April 3, 1931 4 Sheets-Sheet 4

Inventor
Edward F. Zaparka,

By Brasellton Whitcomb & Davies

Attorneys

Reissued Jan. 1, 1935

Re. 19,412

UNITED STATES PATENT OFFICE 19,412

AIRCRAFT AND CONTROL THEREOF

Edward F. Zaparka, Coraopolis, Pa., assignor to Zap Development Company, New York, N. Y., a corporation of Delaware Original No. 1,893,065, dated January 3, 1933, Serial No. 527,482, April 3, 1931. Application for reissue November 12, 1934, Serial No. 752,736

9 Claims. (Cl. 244—12)

Figure 1:
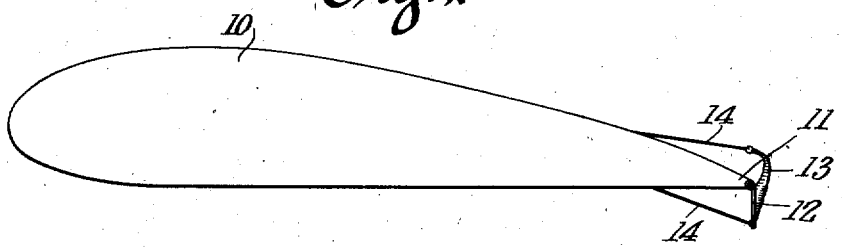

My invention relates in general to an aircraft arrangement whereby the efficiency of the supporting airfoil is materially increased and may be varied by the operator.

My novel arrangement involves the provision of means whereby increased lift efficiency may be utilized at its maximum to decrease the take-off and landing speeds, whereas in flight I am able to vary the same and thus carry more payload per unit area of sustaining surface due to this arrangement. Thus, my invention not only increases the factor of safety, enabling average individuals to fly easily, but may be used to produce a more efficient machine as a whole.

My invention relates to a variable lift airfoil arrangement whereby the lift coefficient per unit area is increased and an improved lateral control provided, also effecting a reduction in the center of pressure travel compared with the center of gravity of the aircraft, thereby materially increasing stability or the action of the aircraft from a balance standpoint.

As one embodiment of my invention, I provide means to modify the circulation or relative hypothetical velocity around the wing or airfoil in such a way that the normal amount of effective circulation is increased, and, moreover, may be varied at will during flight as well as more particularly during "take off" and landing. At the same time, with my invention the burble point ordinarily occurring at high angles of attack, is materially delayed, the lift declining gradually from its maximum instead of abruptly falling off, thus minimizing or avoiding the danger of stalling and eliminating the possibility of spinning.

Discontinuity of airflow near the trailing edge of the airfoil is prevented, and the conditions of airflow at the upper surface of the wing are very much improved.

With my invention under all normal conditions of flight, an aircraft so equipped will be subject to less variations in the angle of attack than an aircraft with an ordinary airfoil. With an ordinary airfoil, the center of pressure travels forwardly and rearwardly in accordance with the angle of attack bringing about nose heavy and/or tail heavy conditions which may make the aircraft unstable and liable to spin. With my invention because the variations in the angle of attack in normal conditions of operation are greatly reduced, the center of pressure always remains closer to the center of gravity and the aircraft has, therefore, greater stability and is more easily controlled.

My invention offers a great advantage,—that an airplane for carrying a certain load may be equipped with a smaller wing than the usual design requires. From a manufacturing standpoint, this means less cost, lighter weight for the same purpose and from an operating standpoint, more payload, the efficiency of such a plane being very much higher. For the operator of such a new plane, it would mean greater payload, less steering effort, greater range. It means that the plane would be very much cheaper to operate, and the maintenance of such a plane is very much lower than that of any present day plane. Furthermore, the wing construction is subjected to smaller bending stress, the safety of such a wing structure being greater.

In high speed conditions, the variable obstruction means for increasing the lift by interposing drag at take off could be submerged and minimum drag is restored. At all other combined positions the drag is less compared with the drag of a wing only when the same are set at higher angles of attack, as has been proposed in order to obtain the same lift which I obtain with a combination of wing and flaps.

I have found that by introducing a variable drag producing element on the under surface of the airfoil, and preferably at, or near, the trailing edge thereof, I am able to greatly increase the lift or thrust produced and to maintain the lift or thrust even at very high angles of attack. Exhaustive wind tunnel tests have shown that even with the added drag produced by the above element the total drag of the airfoil is less than the same airfoil not so equipped when set at its proper angle of attack to produce an equivalent lift or thrust or conversely under equal conditions of drag the airfoil incorporating my invention will produce a greater lift or thrust than the same airfoil not so equipped. By varying the action of the drag producing element I am able to produce this greater lift or thrust during those periods of airplane operation when maximum lift or thrust is vitally necessary as at takeoff and landing, and during climb, and yet do away with the additional drag during periods of normal flight when the ordinary airfoil produces sufficient, or more than sufficient lift or thrust for proper sustentation of the plane. I am thus able to utilize the airfoil at its best efficiency under all conditions.

The stability of a machine equipped with my invention improves materially in view of the fact of the large range of different wing characteristics which may be obtained in said embodiment of my invention by simply tilting the auxiliary flap or by increasing or decreasing the drag producing means. This above-mentioned range, obtainable by simply tilting the flap means provided as one embodiment of the invention, enables the pilot of a ship equipped with my device to take off, land, fly horizontally and climb; and all the time to keep the ship or the fuselage horizontal or level, even with large changes in its loading against the customary way now used, by tilting the whole plane by means of elevators on the tail. In other words, the airplane equipped with this new device can be flown without touching the elevator control. The stability of such a new ship is materially improved so that airplanes can be operated by untrained pilots—the lack of satisfactory control of the ship, particularly as to the operation of the elevator controls, being one of the obstructions to more extensive use of standard airplanes, as long training is required for satisfactory results.

With these and other objects in view, the invention resides and consists in the construction and novel combination and arrangement of certain embodiments thereof, hereinafter more fully described and illustrated in the accompanying drawings, it being understood that various other arrangements and changes in the form, proportion, size or other details of construction, may be resorted to without departure from the spirit of the invention.

I have as stated above made extensive wind tunnel tests and have accurate data showing that with my improved device I may obtain greater payload with the same power, the lift adjusted ideally to various loads, the ratio of $$\frac{L}{D}$$

is better than on an ordinary wing, particularly at higher values of lift coefficient. I obtain materially lower landing speeds, greater top speed, and better climb. I can also build a smaller machine, a lighter machine, and, therefore, may produce a large increase in payload for the same power and gross weight. By my simplified steering, I obtain much better stability and, therefore, produce a much safer aircraft, and this very simplified control makes the machine much more universally usable.

Figure 2:
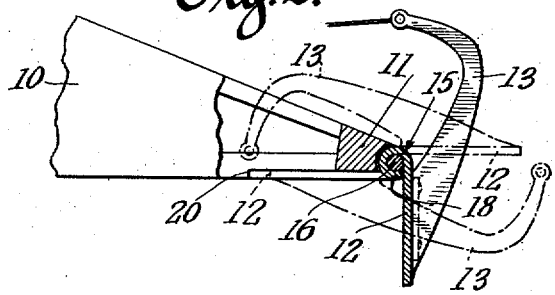
Figure 3:
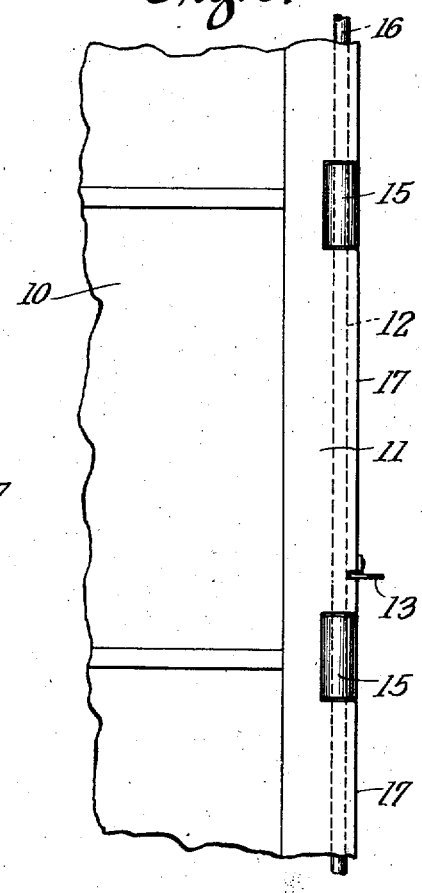
Figure 4:
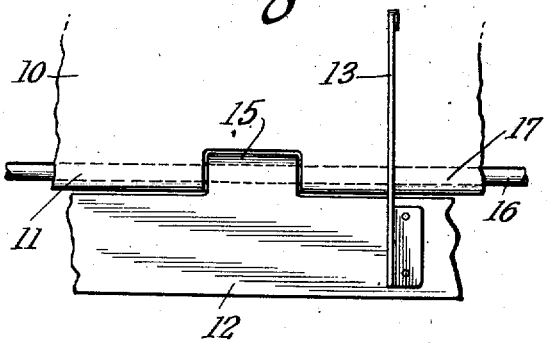
Figure 5:
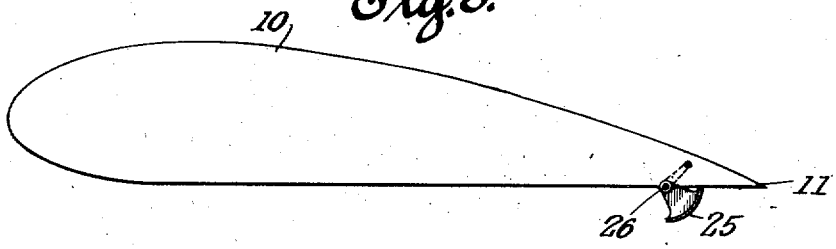
Figure 6:
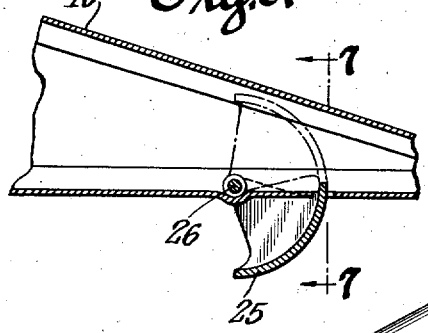
Figure 7:
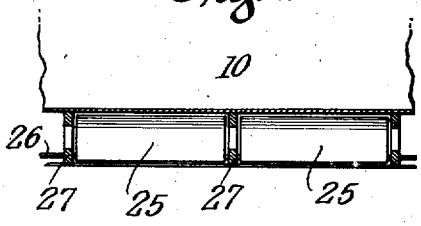
Figure 8:
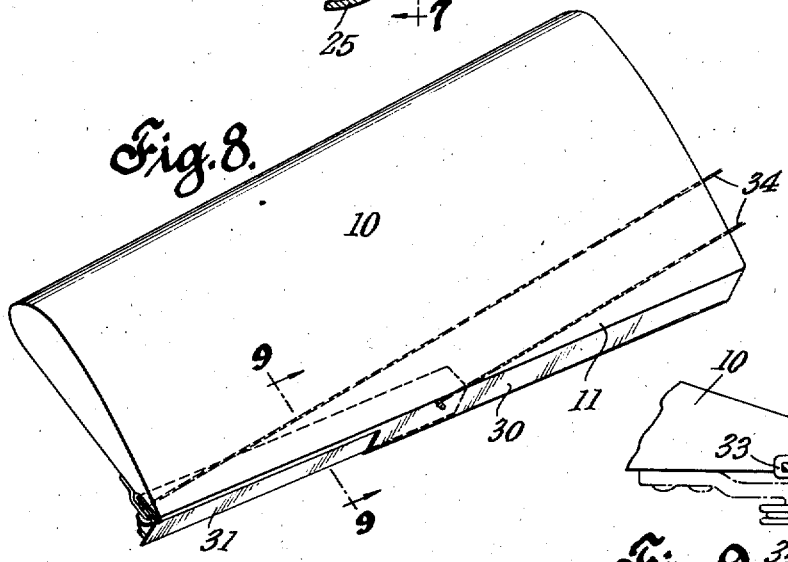
Figure 9:
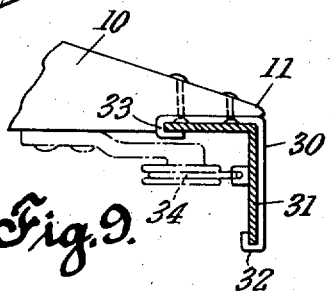
Figure 10:
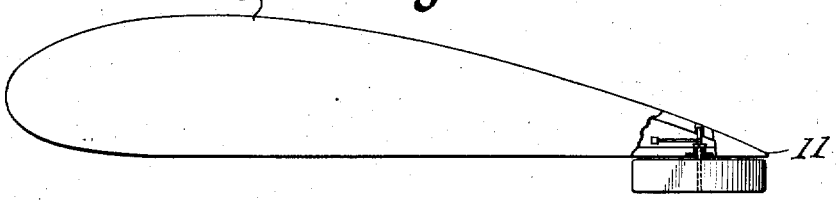
Figure 11:
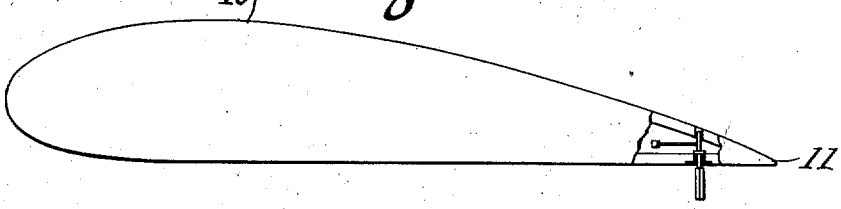
Figure 14:
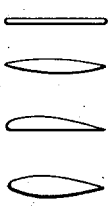
Figure 15:
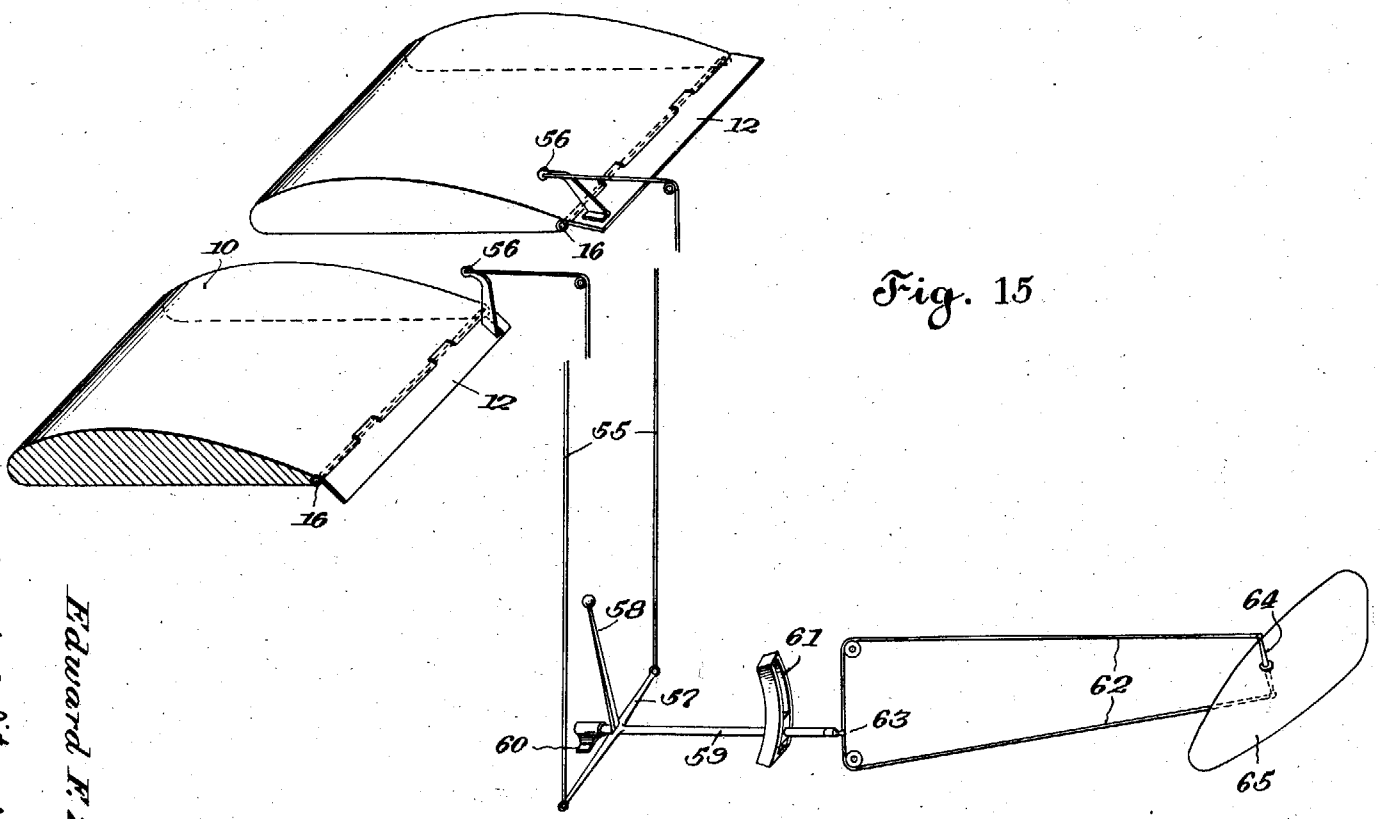

Referring to the drawings, Figure 1 illustrates one embodiment of my invention showing diagrammatically the cross-section of an airfoil with my improved means associated therewith. Figure 2 is a sectional view at the trailing edge of an airfoil, showing the constructional arrangement of one means for utilizing the invention, whereas Figures 3 and 4 are plan views thereof with the flap in various positions. Figure 5 is a view similar to Figure 1 showing a modified arrangement. Figure 6 is a sectional view showing the construction illustrated in Figure 5. Figure 7 is a section on the line 7—7 of Figure 6. Figure 8 is a perspective view of an airfoil with a modified arrangement. Figure 9 is a cross-sectional view of the construction taken on the line 9—9 of Figure 8. Figures 10, 11, 12, and 13 are similar views of a further embodiment of my invention, in which the depending flap may be pivoted to an effective or non-effective position, whereas Figure 14 illustrates several configurations of the sectional pivoted flaps illustrated in Figures 10 to 13. Figure 15 is a perspective view showing my invention and a control means therefor.

Referring to the embodiment chosen to illustrate the invention in Figure 1, one of an almost unlimited number of forms of airfoil 10 may be selected with which to incorporate my invention where I have shown a pivoted rigid flap 12 located at the trailing edge 11 of the airfoil 10. As shown in Figure 2, a convenient method of moving the flap 12 is by employing a "horn" 13 to which an endless wire or cord 14 is attached, following the manner in which ailerons are now controlled, as will be understood by those skilled in the art. The hinge 15 may be made in an infinite number of varieties, but I have shown the same as including a rod 16 secured to the airfoil 10 by the portions 17, the flap 12 having a curled-over portion 18, as shown in Figure 2, for securing the same on the rod 16.

The flap 12 may extend partially from the fuselage of the aircraft to the wing tip or wholly across the same. It may be of uniform height or depth throughout or varied as may be desired, tapering from the fuselage towards the wing tip, or vice versa. It may be constructed of any suitable material and may be suitably reinforced.

The under side of the airfoil 10 is provided, as shown in Figure 2, with a recess 20 within which the flap 12 may be submerged or completely concealed when swung forward to horizontal position, as illustrated in dotted lines, Figure 2. Moreover, the flap 12 may be swung horizontally rearwardly of the trailing edge of the airfoil, as also indicated in the dotted lines in the same figure.

In Figure 5 I have shown an airfoil 10 with a curved depending flap 25 pivoted forwardly of the trailing edge 11 a sufficient distance to permit the curved flap 25 to be completely housed within the airfoil construction. As illustrated in Figure 6, the flap 25 is pivoted at 26 and may be constructed as shown in Figure 7, in sections, to miss the cord construction 27 of the airfoil 10.

In Figures 8 and 9 I have illustrated a further embodiment of my invention by providing telescoping slidable sections of a depending flap 30, 31, the flap 30 being fixed at the trailing edge 11 of the airfoil 10, as shown, and being provided with channels 32 and 33 within which the inner sliding member 31 may be located in a sliding fit, there being a control cord or wire 34 fastened to the inner flap 31 in such a manner that the same may be slid in and out relative to the fixed depending flap 30.

Figure 12:
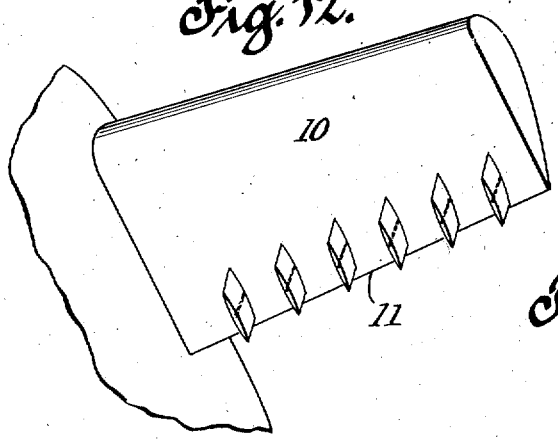
Figure 13:
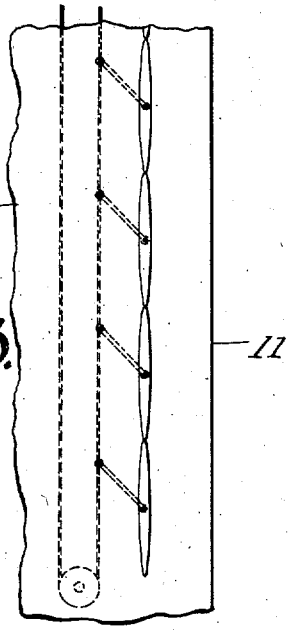

In Figures 10 to 14 I have illustrated still further embodiments of my invention, wherein the airfoil 10 is provided in the neighborhood of the trailing edge 11 with a series of pivoted shutters or blades 40, mounted on pivots 41 provided with suitable horns or controlling elements 42 adapted to be connected by the cord or wire 43 so that the same may be operated in unison as desired by the operator. As illustrated in Figure 12, I provide a series of these pivoted shutters 40 adjacent the center portion of the wing on the underside thereof as I have found that the use of the flaps at a portion of the wings from the fuselage outward gives by far the greater percentage of the increased drag, and, therefore, increased lift coefficient provided by my invention, tests showing that the use of a flap up to 60% of the length from the center to the top of the wing will give approximately 90% of any added drag obtainable by the construction.

In Figure 14 I have shown a series of cross-sections of the blade 40 of different transverse configuration in the blades 45, 46, and 47, which may be used when turned to their "off" position, the particular shape chosen being useful in reducing the resistance to a minimum when this action is desired.

In the operation of my improved invention I propose an arrangement whereby the operator will have the flaps 12, 25, 31, and 40 their most effective positions at take-off. In this manner means is provided to increase the drag at the lower surface of the airfoil and rearwardly of the front portion thereof and in the specific embodiments illustrated at the trailing edge. This construction accomplishes, among other things, such a change in the air flow around the airfoil as to prevent a tendency of the exchange of energy from the pressure side around the trailing edge to the vacuum side; actually increasing the "effective" air circulation, and to produce the equivalent of setting the airfoil at a higher angle of attack, so that take-off is obtained at a much lower ground speed than heretofore possible. It is to be noted that the flaps provided form a positive stop enclosure for the flow of air directly around the trailing edge of the airfoil 11 from the lower side to the upper side.

It will be understood that in flight the operator moves the flap into any of the various positions illustrated in the drawings, so that the increased drag on the lower side of the airfoil at take-off is reduced to a minimum or completely eliminated in flight, so that the top speed is thereby materially increased as compared with the airfoil design which would give the same (if possible) low take-off speed.

In Figure 15 I have shown in perspective view, the particular embodiment of my invention illustrated in Figures 1 to 4 inclusive, with the flap 12 pivoted at its forward edge 16, and an illustration of a conventional method of moving the two flaps 12 either simultaneously or separately, each flap being attached to the airfoils 10 on opposite sides of the center of the aircraft. Thus the links 55 are pivoted to the flaps 12 at 56 and to a cross arm 57 having a control stick 58 arranged to be moved left and right to thereby lower one flap 12 and raise the other as will be apparent from the linkage illustrated. Moreover, the control stick 58 is pivoted at 60 so that the same may be moved forward and aft, and the rear end of the extension 59 connected to the control stick 58 is guided in guides 61 when the same is pivoted on its pivot 60. A cord or wire 62 is connected over pulleys to a fixed connection 63 to the extension 59, said wires extending to the horns 64 connected to the elevator 65 at the rear of the aircraft, all as will be readily understood by those skilled in the art. Of course, this same arrangement of control could be connected with a standard type of stabilizer, it being understood that the control arrangement shown can be limited to a movement simultaneously or differentially of the flaps 12 alone without having the connection to the rear controls of the aircraft.

Various other modifications of the invention as disclosed may be made, and, therefore, I do not wish to be restricted to the particular embodiments shown.

Having thus described my invention, what I desire to claim is:

1. A sustentation body having a curved upper surface; a lower surface intersecting the same at the trailing edge, said surfaces arranged to produce in flight a reduction of pressure above the upper surface, an increase of pressure below the lower surface; a longitudinally extending surface connected at said intersecting edge of the lower surface with the upper surface, said longitudinal surface projecting substantially at right angles to said lower surface and arranged to provide an increase in pressure on the lower surface and prevent an interchange of the increased pressure on the lower surface and reduced pressure on the upper surface, and means whereby said longitudinal surface is adjusted to various positions with respect to said lower surface.

2. An aircraft sustentation body comprising an upper surface, a lower surface, said surfaces uniting in a projecting nose and intersecting at the trailing edge, in combination with a downwardly extending surface located at said trailing edge and extending longitudinally of said body arranged to cut off interchange of pressure around the trailing edge from the lower surface to the upper surface, and to increase the pressure on the lower surface, and means to adjust said longitudinal surface to various positions with respect to said lower surface.

3. In an aircraft, an airfoil construction comprising an upper surface; a lower surface, said surfaces meeting at a trailing edge and arranged to produce in flight a reduction in pressure above the upper surface and an increase in pressure below the lower surface; an obstruction element extended from said airfoil closely adjacent the trailing edge thereof to increase the pressure under the lower surface and reduce the turbulence on the rearward portion of the upper surface; and means whereby the action of said last mentioned means is varied.

4. In an aircraft, an airfoil construction comprising an upper surface; a lower surface, said surfaces arranged to produce a difference in pressure above the upper surface relative to the pressure below the lower surface, said upper surface being relatively immovable with respect to said airfoil body and to said other surface; downwardly directed means connected to said airfoil closely adjacent the trailing end thereof, said means comprising a drag-producing surface independent of said upper surface arranged to directly contact with said lower surface at its upper end to cut off flow or interchange of pressure around the trailing end of the airfoil, said drag-producing surface extending adjacent a plane substantially perpendicular to the airfoil at its trailing end to increase the pressure on the lower surface and reduce the turbulence over the upper surface; and means whereby said resistance surface is adjusted to various positions.

5. In an aircraft, an airfoil construction comprising an upper surface; a lower surface, said upper surface being relatively immovable with respect to said airfoil body and said surfaces arranged to produce a difference in pressure above the upper surface relative to that below the lower surface; downwardly extended drag-producing means located at the rear of the center of the lower surface to increase the pressure on the lower surface and reduce the turbulence over the rearward portion of the upper surface, said means including a flap construction independent of said upper surface, said flap construction arranged to substantially cut off the flow or interchange of pressure around the trailing end of said airfoil, said flap construction extending adjacent the plane passing through the trailing end of the airfoil and substantially perpendicular to the airfoil; and means whereby said resistance surface is adjusted to various positions.

6. In an aircraft, a movable force-producing body comprising an airfoil having main opposed surfaces, said surfaces diverging one from the other at the nose, and converging toward the trailing end adjacent the rear of said body, one of said surfaces being relatively immovable with respect to said airfoil body, said surfaces arranged to produce a relative difference in pressures adjacent said surfaces, in combination with a drag-producing means arranged to increase the pressure adjacent one of said surfaces, and reduce turbulence over said last mentioned surface by obstructing interchange of pressure around the rear of the airfoil body, said means comprising a resistance surface independent of and additional to said immovable main surface located relatively closely adjacent the trailing end of the airfoil body in such close proximity thereto as to substantially obstruct pressure interchange between said main surfaces, said resistance element arranged to extend a depth of not over from 20% to 25% of the chord length of said airfoil and arranged to extend adjacent a plane substantially perpendicular to said body and passing through the trailing end thereof; and means whereby said resistance surface is adjusted to various positions.

7. In an aircraft, an airfoil construction comprising an upper surface; a lower surface, said surfaces meeting at a nose and converging rearwardly, arranged to produce in flight a reduction in pressure above the upper surface and an increase in pressure below the lower surface; and an obstruction element comprising an adjustable flap having its upper edge located adjacent said lower surface; means whereby said flap may be adjusted to various positions, said flap arranged in its substantially completely extended position to have its lower edge below and substantially in the locus of perpendiculars to the airfoil chords that pass through the trailing edge of the airfoil.

8. In an aircraft, an airfoil construction comprising an upper surface; a lower surface, said surfaces meeting at a nose and converging rearwardly, arranged to produce in flight a reduction in pressure above the upper surface and an increase in pressure below the lower surface; and an obstruction element comprising a flap mounted to swing on a pivot and having its upper edge located adjacent said lower surface; means whereby said flap may be adjusted to various positions, said flap arranged in its substantially completely extended position to have its lower edge below and substantially in the locus of perpendiculars to the airfoil chords that pass through the trailing edge of the airfoil.

9. In an aircraft, an airfoil construction comprising an upper surface; a lower surface, said upper surface being relatively immovable with respect to said airfoil body and said surfaces arranged to produce a difference in pressure above the upper surface relative to that below the lower surface; downwardly extended drag-producing means located at the rear of the center of the lower surface to increase the pressure on the lower surface and reduce the turbulence over the rearward portion of the upper surface, said means including an adjustably mounted flap construction independent of said upper surface, means to move said flap whereby its trailing edge is adapted to travel substantially in a straight line during movement to and from extended position with its lower edge below and substantially in the locus of perpendiculars to the airfoil chords that pass through the trailing edge of the airfoil when said flap is in its substantially completely extended position.

EDWARD F. ZAPARKA.